United States Patent
Bircher (10) Patent No.: US 12,320,940 B1
(45) Date of Patent: Jun. 3, 2025

(54) ACOUSTIC TRANSDUCER FOR TOWED SEISMIC PINGER

(71) Applicant: DigiCOURSE, LLC, Harahan, LA (US)

(72) Inventor: Felix Ernest Bircher, Metairie, LA (US)

(73) Assignee: DigiCOURSE, LLC, Harahan, LA (US)

( * ) Notice: Subject to any disclaimer, the term of this patent is extended or adjusted under 35 U.S.C. 154(b) by 0 days.

(21) Appl. No.: 19/048,248

(22) Filed: Feb. 7, 2025

Related U.S. Application Data (60) Provisional application No. 63/658,545, filed on Jun. 11, 2024.

(51) Int. Cl.
- *G10K 11/00* (2006.01)
- *G01V 1/38* (2006.01)
- *G10K 11/02* (2006.01)

(52) U.S. Cl.
CPC .......... *G01V 1/3843* (2013.01); *G10K 11/008* (2013.01); *G10K 11/02* (2013.01); *G01V 2210/1423* (2013.01)

(58) Field of Classification Search
CPC ......... G01V 1/3843; G01V 2210/1423; G10K 11/008; G10K 11/02
See application file for complete search history.

(56) References Cited

U.S. PATENT DOCUMENTS

| | | | | |
|---|---|---|---|---|
| 3,113,287 | A * | 12/1963 | Renner | G10K 11/004 310/345 |
| 5,109,364 | A * | 4/1992 | Stiner | G10K 11/006 367/173 |
| 6,377,516 | B1 * | 4/2002 | Whiteside | G10K 11/006 367/173 |
| 11,367,425 | B2 * | 6/2022 | Antao | G10K 11/006 |
| 11,921,199 | B2 * | 3/2024 | Hooper | G01S 7/629 |
| 2013/0016588 | A1 * | 1/2013 | O'Dell | G10K 11/006 367/173 |
| 2017/0360321 | A1 * | 12/2017 | Wolber | A61B 5/291 |

* cited by examiner

*Primary Examiner* — Krystine E Breier
(74) *Attorney, Agent, or Firm* — Haynes and Boone, LLP; Mark A. Tidwell (57) ABSTRACT

A transducer assembly for attachment to a marine device for use in marine seismic applications. The transducer assembly includes an attachment portion attachable to the marine device and a transducer portion attachable to the attachment portion. The attachment portion is fabricated with a relative larger diameter and of a first material selected for strength, while the transducer portion of the transducer assembly is fabricated with a relative reduced diameter of a second material selected to minimize interference with acoustic signals propagating to or from the transducer portion. The reduced diameter of the transducer portion reduces the incidence and magnitude of drag during the marine seismic applications and minimizes the negative effects of drag on the results of the marine seismic application. The second material of the transducer portion is selected to have an acoustic impedance that minimizes interference with the operation of a transducer positioned within the transducer portion.

28 Claims, 5 Drawing Sheets

ACOUSTIC TRANSDUCER FOR TOWED SEISMIC PINGER

CROSS-REFERENCE TO RELATED APPLICATION

This application claims priority to and the benefit of the filing date of U.S. Provisional Application No. 63/658,545, filed Jun. 11, 2024, the entire disclosure of which is hereby incorporated herein by reference.

FIELD OF THE DISCLOSURE

The present disclosure relates, in general, to acoustic ranging devices, and more particularly, to an underwater transducer assembly for attachment to marine equipment.

BACKGROUND

Acoustic ranging devices are commonly used in marine seismic applications for oil and gas exploration, offshore windfarm construction planning, carbon sequestration site surveying and monitoring, as well as other applications. These acoustic ranging devices utilize transducer assemblies to gather acoustic ranging data used to help determine the positions of underwater equipment in an environment where GPS signals cannot be used for positioning purposes. The position estimates that are ultimately generated via acoustic ranging data may be utilized in algorithms for processing seismic data sets, or they might be part of a feedback loop used by other systems that control the position of underwater equipment. Acoustic ranging data is sometimes combined with other data (e.g., compass heading data) to generate position estimates. The equipment whose positions are being calculated utilizing the acoustic ranging data might be part of ocean bottom acoustic systems, or towed array acoustic systems, or attached to underwater vehicles that are in motion during the acoustic ranging activities.

For towed array systems and underwater vehicle systems, hydrodynamic drag is typically a significant operational consideration that can negatively impact operation of the transducer assemblies. Hydrodynamic drag negatively impacts energy consumed to move the underwater equipment; it imposes forces on the hardware to which it is attached that can damage the attachment points over time; and it can generate acoustic noise which negatively affects the acoustic performance of surrounding acoustic systems.

Similarly, acoustic performance may be impacted by signal propagation to or from the transducer assemblies. For this reason, transducer assemblies are often fabricated of expensive materials selected to minimize signal interference.

DETAILED DESCRIPTION

The following disclosure provides many different embodiments. Specific examples of components and arrangements are described below to simplify the present disclosure. These are, of course, merely examples and are not intended to be limiting. In addition, the present disclosure may repeat reference numerals and/or letters in the various embodiments. This repetition is for the purpose of simplicity and clarity and does not in itself dictate a relationship between the various embodiments and/or configurations discussed.

Disclosed herein is a transducer assembly attachable to a marine device for use in marine seismic applications. In one or more embodiments, the transducer assembly is a two-piece assembly including an attachment portion attachable to the marine device and a transducer portion attachable to the attachment portion. The attachment portion is fabricated with a relative larger diameter and of a first material selected for strength, while the transducer portion of the transducer assembly is fabricated with a relative reduced diameter of a second material selected to minimize interference with acoustic signals propagating to or from the transducer portion. The reduced diameter of the transducer portion reduces the incidence and magnitude of drag, strain, snag, impact, and noise during the marine seismic applications and minimizes their negative effects on the results of the marine seismic application. The second material of the transducer portion is selected to be a different material than the first material of the attachment portion and is selected to have a specific acoustic impedance that minimizes interference with the operation of a transducer positioned within the transducer portion.

Figure 1:
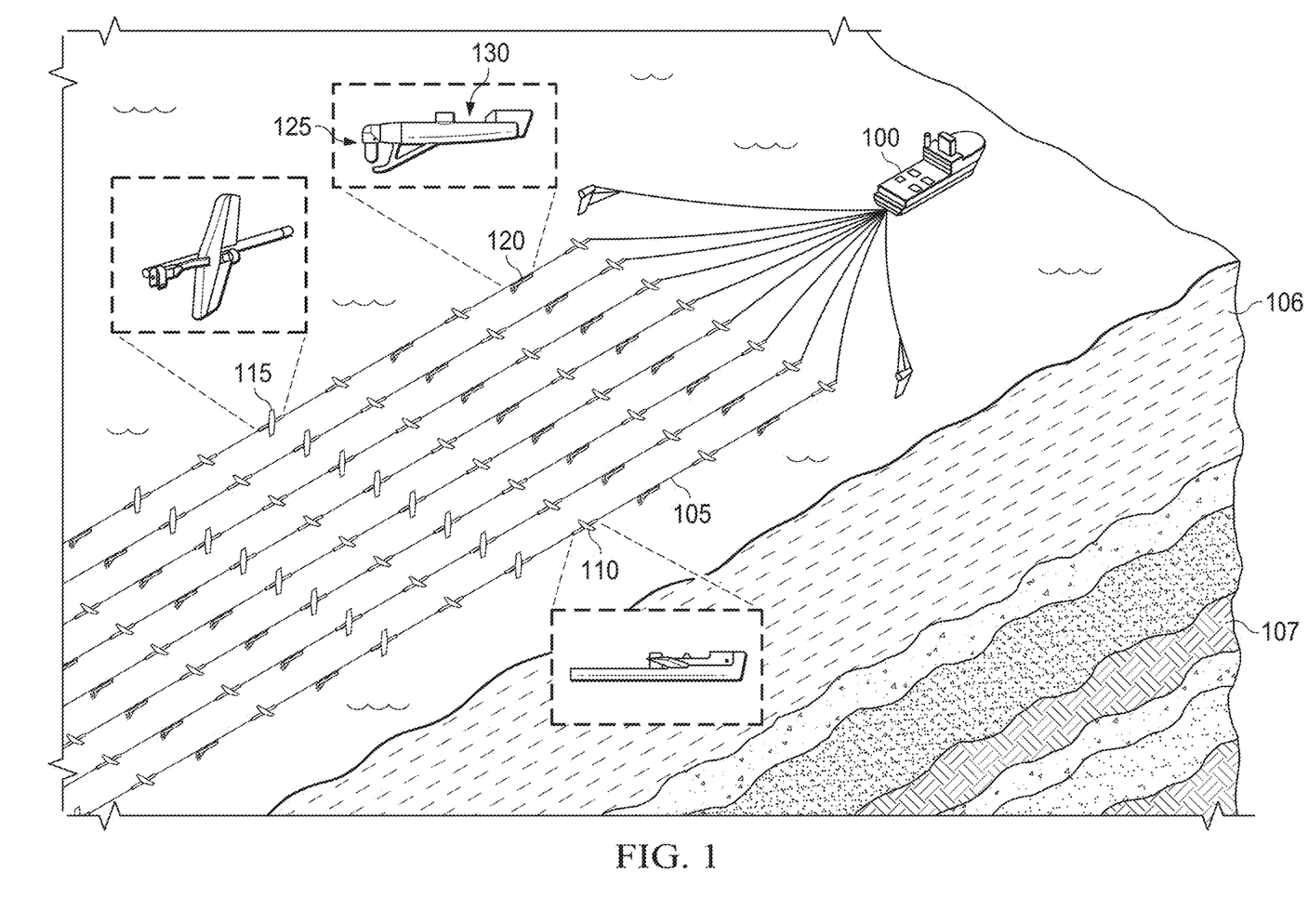
FIG. 1 illustrates a survey vessel towing a streamer network including an acoustic ranging assembly, the acoustic ranging assembly including a marine device and a transducer assembly, according to one or more embodiments.

FIG. 1 illustrates a survey vessel 100 towing a plurality of streamer cables 105 above or in a body of water 106 in order to survey a geologic formation 107 lying beneath the body of water 106. Each streamer cable 105 includes one or more positioning devices, which can include depth control birds 110, lateral control devices 115, and acoustic ranging assemblies 120. Each acoustic ranging assembly 120 includes a transducer assembly 125 and a marine device 130. The transducer assembly 125 is attachable to and supported by the marine device 130. In one or more embodiments, the marine device 130 may be buoyant or semi-buoyant such that the marine device 130 may be towable at the surface or below the surface of the body of water 106. In one or more embodiments, the survey vessel 100 and the plurality of streamer cables 105, including the one or more positioning devices, may be deployed in a marine seismic application, such as a search for hydrocarbon deposits in the geologic formation 107.

Figure 2:
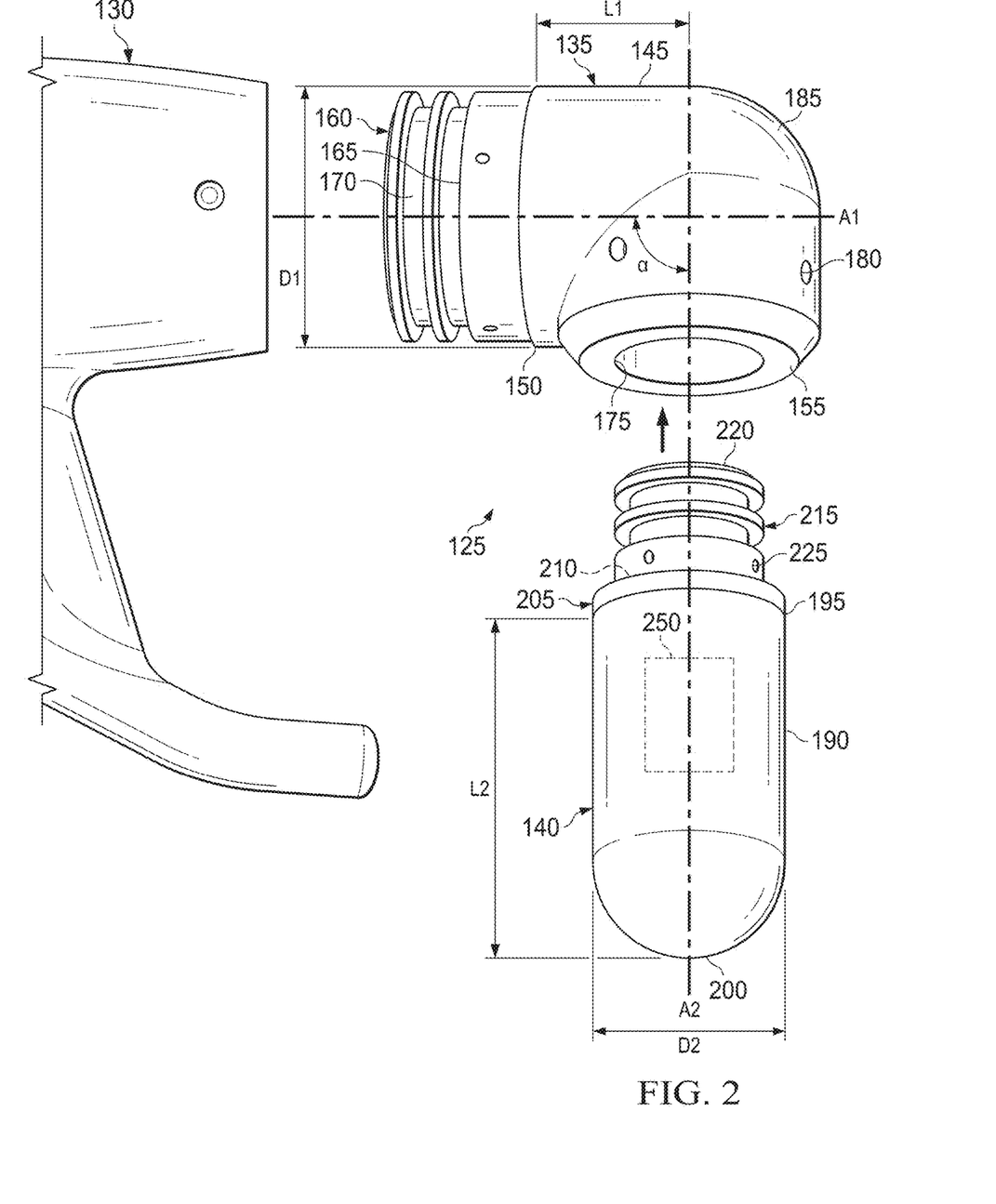
FIG. 2 illustrates the transducer assembly of FIG. 1 in a disassembled configuration, the transducer assembly including an attachment portion and a transducer portion, according to one or more embodiments.

FIG. 2 illustrates the transducer assembly 125 of FIG. 1 in more detail. The transducer assembly 125 is a two-piece assembly including an attachment portion 135 and a transducer portion 140. In FIG. 2, the transducer assembly 125 is shown in a detached or unassembled configuration. In the unassembled configuration, the transducer assembly 125 is detached from the marine device 130 and the transducer portion 140 is detached from the attachment portion 135.

The transducer assembly 125 is configured to be attached to the marine device 130 via the attachment portion 135. When attached to a marine device 130 deployed in a body of water 106 as shown in FIG. 1, in some configurations, the attachment portion 135 is substantially horizontal and the transducer portion 140 is substantially vertical, and thus is depicted in such an orientation in FIG. 2.

The attachment portion 135 of the transducer assembly 125 has a first body 145 having a first length L1 that extends longitudinally along a first central axis A1 between a first end 150 and a second end 155 of the first body 145. At least a portion of the first body 145 has a first diameter D1. The first body 145 is substantially cylindrical and is formed of a first material having a first acoustic impedance.

The first end 150 of the attachment portion 135 is configured to be attached to the marine device 130. As such, the first end 150 includes an attachment mechanism 160 that facilitates attachment of the attachment portion 135 to the marine device 130. The disclosure is not limited to a particular configuration for attachment mechanism 160. In one or more embodiments, optionally, the attachment mechanism 160 may include a sleeve 165 attached to the first end 150 of the attachment portion 135. The sleeve 165 includes at least one annular groove 170 disposed about a perimeter of the sleeve 165 and at least one radially extending aperture (not shown) configured to receive a fastener to facilitate secure attachment of the attachment portion 135 to the marine device 130. In one or more embodiments, the annular groove 170 may be an O-ring groove such that the annular groove 170 is adapted to receive an O-ring. In one or more embodiments, the sleeve 165 may include, or may be formed of, a hard plastic such as acrylonitrile butadiene styrene ("ABS") or another hard material. In one or more embodiments, the sleeve 165 may have an outer diameter that is equal to the first diameter D1. In one or more embodiments, the first end 150 of the first body 145 may have a diameter that is less that the first diameter D1. In one or more embodiments, the sleeve 165 may be integrally formed with the first body 145 such that the sleeve 165 and the first body 145 are one uniform component.

The second end 155 of the attachment portion 135 includes an opening 175 configured to receive the transducer portion 140 of the transducer assembly 125. The second end 155 may include at least one radially extending aperture 180 configured to receive a fastener to facilitate secure attachment of the attachment portion 135 with the transducer portion 140. In one or more embodiments, the second end 155 of the attachment portion 135 may be tapered, beveled, or inwardly chamfered about the perimeter of the second end 155 to facilitate coupling.

In the embodiment shown, the first body 145 of the attachment portion 135 includes an elbow 185 between the first end 150 and the second end 155 such that the second end 155 is laterally offset from the first end 150 and such that the opening 175 of the second end 155 extends in a plane that is angled relative to a plane in which the first end 150 extends based on the angle of the elbow 185. In the embodiment shown, the elbow 185 is a 90-degree elbow. Thus, in the embodiment shown, the plane in which the opening 175 of the second end 155 extends is perpendicular to a plane in which the first end 150 of the first body 145 extends. In one or more embodiments, the plane in which the opening 175 extends is also parallel to and vertically offset from the first axis A1. In one or more other embodiments, the second end 155 may be recessed within the first body 145 such that the first axis A1 extends through the plane in which the opening 175 extends and such that the opening 175 is flush with the first axis A1.

With continued reference to FIG. 2, the transducer portion 140 of the transducer assembly 125 has a second body 190 having a second length L2 that extends longitudinally along a second central axis A2 between a first end 195 and a second end 200. In one or more embodiments, L2 is greater than or equal to L1 such that transducer portion 140 extends away from attachment portion 135 and marine device 140 in order to minimize interference from attachment portion 135 and marine device 140 with any acoustic signals propagating to or from transducer portion 140. In the embodiment shown, the second end 200 of the second body 190 is enclosed. In one or more embodiments, the enclosed second end 200 may be rounded, domed, or hemispherical in shape to reduce drag and noise during deployment of transducer assembly 125. At least a portion of the second body 190 has a second diameter D2. In the embodiment shown, the second diameter D2 of the second body 190 is less than the first diameter D1 of the first body 145 in order minimize drag and noise arising from second body 190 while permitting first body 145 to readily attach to marine device 130. Similarly, the second body 190 is substantially cylindrical.

Second body 190 is formed of a second material having a second acoustic impedance. Moreover, second body 190 formed of the second material encases a transducer element 250 as described in more detail below.

The first end 195 of the second body 190 of the transducer portion 140 may be configured to be attached to and received within the second end 155 of the first body 145 of the attachment portion 135. In the embodiment shown, the first end 195 of the second body 190 may include elements similar to those described above with respect to the first end 150 of the first body 145. In any event, the second body 190 includes a base 205. In one or more embodiments, the base 205 facilitates the engagement of the transducer portion 140 to the attachment portion 135.

The first end 195 of the second body 190 may include an opening 210 that is coaxial with the second central axis A2. In one or more embodiments, the base 205 includes an insert 215 disposed to seat in the opening 210 of the second body 190. The insert 215 may facilitate sealing of the second body 190, as well as secure engagement of the second body 190 with the first body 145. In one or more embodiments, the base 205 includes a protrusion 220 disposed and configured to seat in the opening 175 of the second end 155 of the first body 145. In one or more embodiments, the base 205 has a diameter less than or equal to the second diameter D2 of the second body 190. In one or more embodiments, the base 205 may include at least one annular groove disposed about the perimeter of the protrusion 220. In one or more embodiments, the base 205 may include at least one radially extending aperture 225 configured to cooperate with the radially extending aperture 180 of the second end 155 of the first body 145 to receive the fastener to facilitate secure attachment of the second body 190 with the first body 145 and thus securely attach the transducer portion 140 with the attachment portion 135.

In one or more embodiments, the base 205 may include external threads configured to cooperate with internal threads of the second end 155 of the first body 145. In one or more embodiments, the base 205 may include a locking tab or detent pin that cooperates with a corresponding latch or slot of the second end 155 of the first body 145. In one or more other embodiments, the base 205, for when disposed to engage the transducer portion 140 to the attachment portion 135, may include any other form of attachment known in the art and which would be suitable for the given application such that the attachment is able to withstand predetermined amounts of hydrodynamic drag, snagging, or other forces expected to act upon the transducer assembly 125 and the marine device 130 of the acoustic ranging assembly 120.

As shown and described, in one or more embodiments, the transducer portion 140 is attachable to and detachable from the attachment portion 135 of the transducer assembly 125. In one or more other embodiments, the transducer portion 140 and the attachment portion 135 may be integrally formed such that the transducer assembly 125 has one unitary body.

In one or more embodiments, when the transducer portion 140 is attached to the attachment portion 135, the first central axis A1 and the second central axis A2 intersect to form an angle alpha ($\alpha$). In one or more embodiments, the angle $\alpha$ is greater than 0 degrees and equal to or less than 180 degrees. In one or more embodiments, the angle $\alpha$ is equal to or greater than 60 degrees and equal to or less than 130 degrees. In one or more embodiments, the angle $\alpha$ is between 80 degrees and 120 degrees. In one or more embodiments, the angle $\alpha$ is approximately 90 degrees. In one or more embodiments, the angle $\alpha$ corresponds to the angle of the elbow 185.

In one or more embodiments, the second material of the second body 190 may be different than the first material of the first body 145. In one or more embodiments, the second acoustic impedance of the second material may be less than the first acoustic impedance of the first material. In one or more embodiments, the second acoustic impedance of the second body 190 may be approximately 1.48 MPa·s·m$^{-1}$. In one or more embodiments, the second acoustic impedance of the second body 190 may be less than 1.60 MPa·s·m$^{-1}$ and the first acoustic impedance of the first body 145 may be greater than 1.60 MPa·s·m$^{-1}$. In one or more embodiments, the second acoustic impedance of the second body 190 may be in a range from 1.30 MPa·s·m$^{-1}$ to 1.60 MPa·s·m$^{-1}$ and the first acoustic impedance of the first body 145 may be outside the range from 1.30 MPa·s·m$^{-1}$ to 1.60 MPa·s·m$^{-1}$.

In one or more embodiments where the second body 190 and the first body 145 are integrally formed such that transducer assembly 125 has one unitary body, the second material and the first material may be the same. In one or more embodiments where the second body 190 and the first body 145 are detachable from one another, the second material and the first material may be different from one another as described herein.

In one or more embodiments, the second acoustic impedance of the second body 190 may be approximately equivalent to the acoustic impedance of seawater. The acoustic impedance of seawater varies depending on a number of factors, including the salinity, depth, pressure, and temperature of the water. In one or more embodiments, the transducer assembly 125 may be deployed in water depths ranging from 5-20 m. In one or more embodiments, the acoustic impedance of seawater in the environment in which the transducer assembly 125 may be deployed is in a range of $1.4*10^5$-$1.6*10^5$ (gm/cm$^2$*sec).

In one or more embodiments, the second material (or "overmold") of the second body 190 may be PPG PR-1570, which is a polyurethane that has a similar acoustic impedance to seawater, is compatible with long-term exposure to seawater, is relatively robust, and can be molded without air bubbles, which air bubbles can interfere with acoustic signals. In one or more other embodiments, the second material of the second body may be any other similar material known in the art and which would be readily apparent as a suitable replacement to one of ordinary skill in the art. In one or more embodiments, the overmold material may be selected based on the environment in which the transducer assembly 125 is deployed. For example, in one or more embodiments, based on the estimated acoustic impedance of the water in which the transducer assembly 125 will be deployed, an overmold material with a similar acoustic impedance can be selected.

In this regard, one desirable feature of embodiments of transducer assembly 125 where transducer portion 140 and attachment portion 135 are separable or detachable is that different transducer portions 140 having different acoustic impedance may be readily interchanged based on the seawater acoustic impedance characteristics of the seawater in which a transducer assembly 125 is to be deployed.

In one or more embodiments, the first material of the first body 145 may include ABS, polyoxymethylene ("POM") (also known as Delrin), hard polyurethanes, or any other similar material that has reasonable strength, is relatively simple and cost effective to mold and machine, and which is compatible with long-term exposure to seawater.

Figure 3:
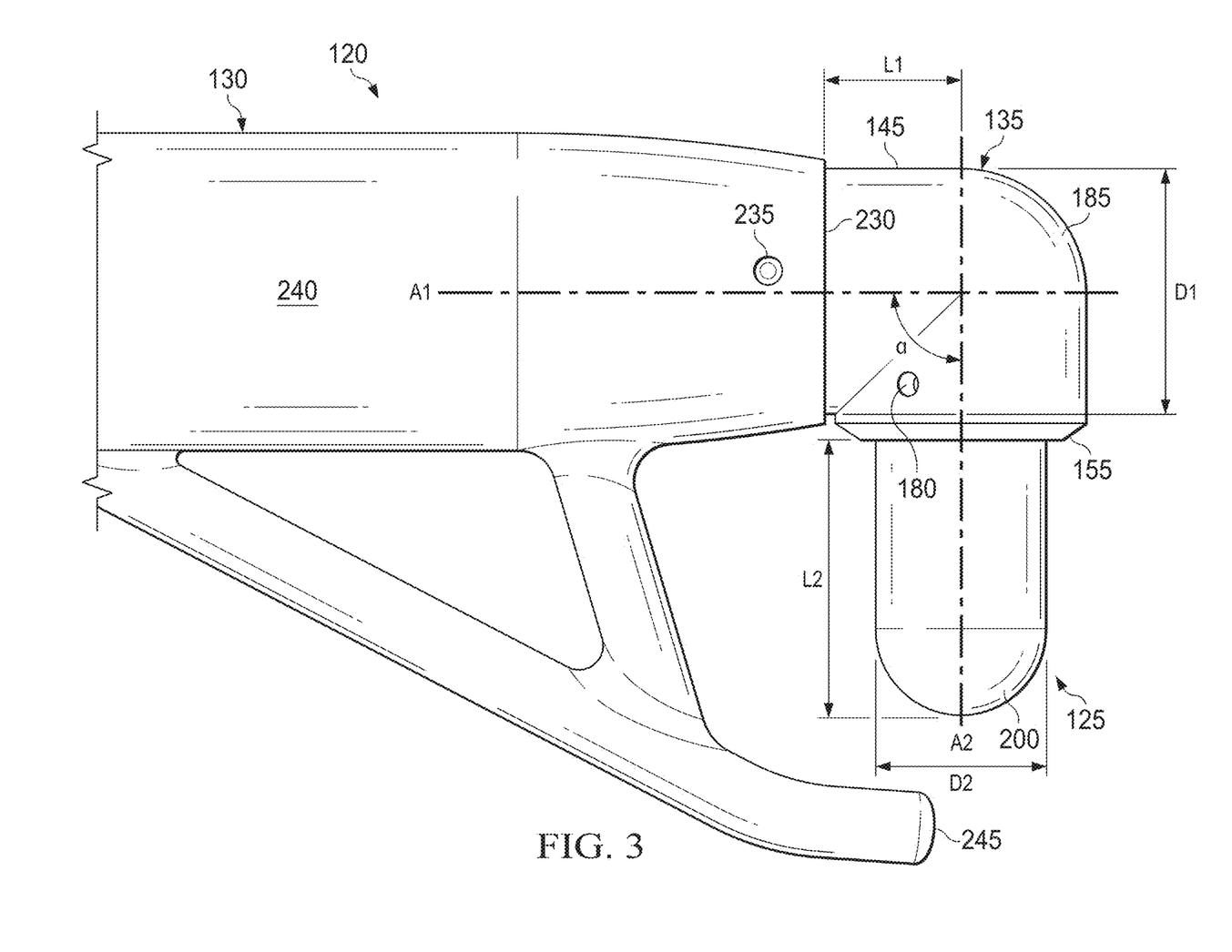
FIG. 3 illustrates the transducer assembly and the marine device of the acoustic ranging assembly of FIG. 1 in an assembled configuration, according to one or more embodiments.

FIG. 3 illustrates the acoustic ranging assembly 120 shown in an assembled configuration including the attachment portion 135 of the transducer assembly 125 attached with the marine device 130. As shown, transducer assembly 125 is assembled with transducer portion 140 coupled with the attachment portion 135. Only a portion of the marine device 130 is shown in FIG. 3 but generally includes a main body 240 extending along axis A1 and disposed to receive transducer assembly 125. In this regard, the portion of the marine device 130 shown in FIG. 3 is the rear or trailing portion of marine device 130.

As shown in FIG. 3, the first end 150 of the attachment portion 135 is configured to be attached to and received within a receiving end 230 of the marine device 130. The receiving end 230 of the marine device 130 is sized such that it receives the first end 150 of the attachment portion 135. Optionally, the receiving end 230 of the marine device 130 may include at least one radially extending aperture 235 configured to cooperate with the at least one radially extending aperture of the attachment portion 135 to receive a fastener and securely attach the attachment portion 135 to the marine device 130.

Optionally, the attachment mechanism 160 of the first end 150 of the attachment portion 135 may include external threads configured to cooperate with internal threads of the receiving end 230 of the marine device 130. In one or more embodiments, the attachment mechanism 160 may include a locking tab or detent pin that cooperates with a corresponding latch or slot of the receiving end 230 of the marine device 130. In one or more other embodiments, the attachment mechanism 160 for attaching the attachment portion 135 to the marine device 130 may be any other form of attachment known in the art and which would be suitable for the given application such that the attachment between the attachment portion 135 and the marine device 130 is able to withstand predetermined amounts of hydrodynamic drag, snagging, or other forces expected to act upon the transducer assembly 125 and the marine device 130 of the acoustic ranging assembly 120.

In the embodiment shown in FIG. 3, the second end 200 of the transducer portion 140 is a free end of the transducer assembly 125 that extends below at least a main body 240 of the marine device 130.

In one or more embodiments, marine device 130 includes an arm 245 extending from main body 240. Arm 245 may extend from main body 240 so as to be at least equal with or below the second end 200 of the transducer portion 140 to protect the transducer portion 140 and reduce the amount of hydrodynamic drag experienced by the transducer portion 140. Thus, in some embodiments, arm 245 may extend at least from main body 240 a distance equal to or greater than second length L2 of second body 190 of transducer portion 140. Yet in one or more other embodiments, the second end 200 of the transducer portion 140 may extend below arm 245 of the marine device 130.

Figure 4:
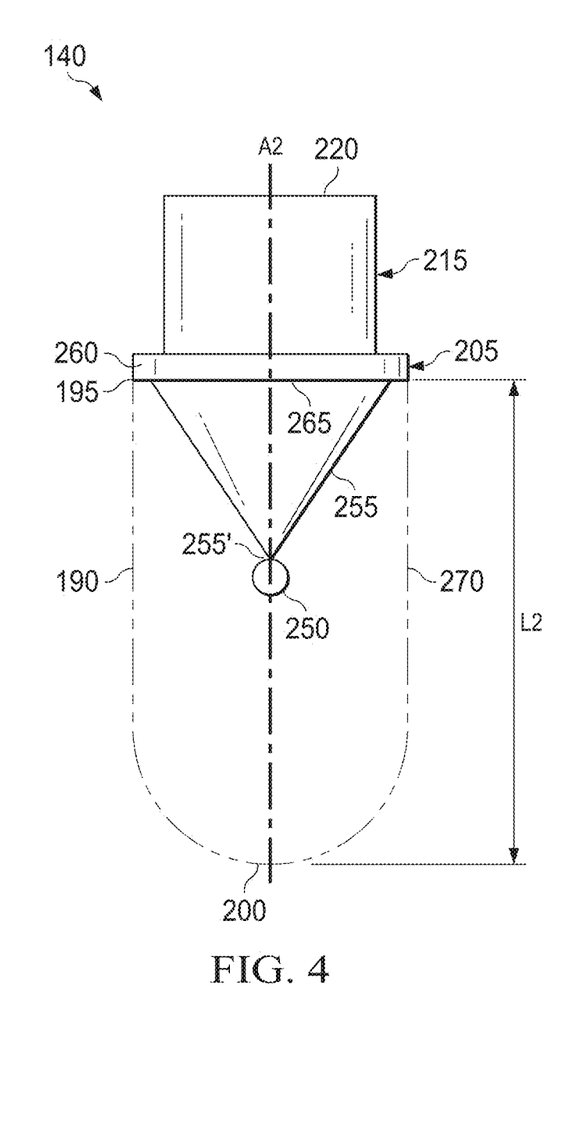
FIG. 4 illustrates a transducer element positioned within the transducer portion of the transducer assembly of the acoustic ranging assembly of FIG. 1, according to one or more embodiments.

FIG. 4 illustrates the transducer portion 140 of the transducer assembly 125. In FIG. 4, the second body 190 of the transducer portion 140 is shown in dashed lines to more clearly illustrate additional internal elements of the transducer portion 140.

As shown in FIG. 4, a transducer element 250 is positioned along the second axis A2 within the second body 190 of the transducer portion 140. A support 255 that extends axially into the second body 190 from the base 205 may be used to centrally position the transducer element 250 within second body 190. In one or more embodiments, the support 255 may be attached or mounted to the base 205. In one or more embodiments, the support 255 and the base 205 may be a single uniform element. In one or more embodiments, the support 255 and the base 205 may be made of a hard plastic, such as ABS. In one or more embodiments, support 255 may be symmetrical about the second axis A2 along the length of support 255.

Support 255 may be selected to minimize interference with any signals propagating to or from transducer element 250. Thus, in the embodiment shown in FIG. 4, the support 255 is a cone, with the transducer element 250 attached to an apex 255' of the cone. A wide end 260 of the support is mounted to an inner side of the base 205 such that the apex 255' of the support is positioned within the second body 190. The support 255 has a cone shape, as opposed to a large, flat or rectangular shape, to minimize the reflection of acoustic signals. The shape of the support 255 prevents acoustic signals from hitting hard surfaces orthogonally, which would reflect those signals. The wide end 260 of support 255 and the inner side 265 of base 205 have substantially the same diameter so as to minimize signal reflections from the base 205 during operation of the transducer assembly 125. The support 255 positions the transducer element 250 away from an exterior surface 270 of the second body 190 and minimizes movement of the transducer element 250 out of position during over-molding of the second body 190. The support 255 also positions the transducer element 250 away from the first end 195 (which may be formed of a different material) and the inner side 265 of the base 205 to prevent reflections of acoustic signals caused by those surfaces.

Although not limited to a particular transducer element, optionally, the transducer element 250 is ball shaped. In one or more embodiments, the transducer element 250 may be a ceramic ball. Regardless of the shape, the transducer element 250 may be fragile, thus one of the functions of the overmold material is to protect the transducer element 250. In one or more embodiments, the transducer element 250 may be fully encased by the overmold material such that there are no air gaps or open areas within the second body 190. In one or more embodiments, the overmold material may extend from the first end 195 of the second body 190 adjacent the base 205 to the second end 200 spaced apart from the base 205 (i.e., a distal end). In one or more embodiments, the overmold material at the second end 200 of the second body 190 may be hemispherical in shape and the transducer element 250 may be positioned at the center of the hemispherical distal end.

Figure 5:
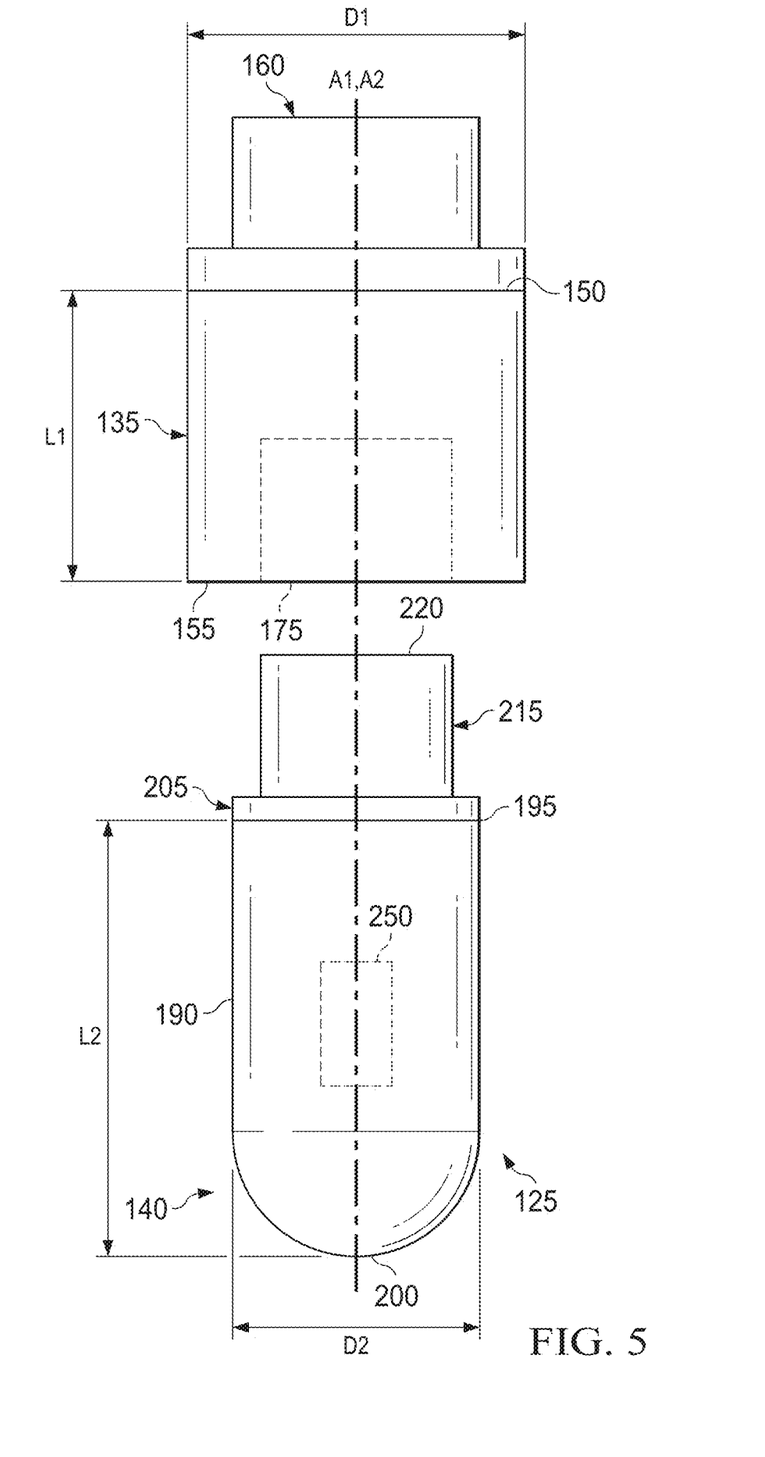
FIG. 5 illustrates another embodiment of the transducer assembly of the acoustic ranging assembly of FIG. 1, according to one or more embodiments.

FIG. 5 illustrates another embodiment of a transducer assembly 500. The transducer assembly 500 shown in FIG. 5 contains many of the same or similar components as the transducer assembly 125 described above with respect to FIGS. 2-4. Such components are given the same reference numerals in FIG. 5 as they are in FIGS. 2-4. The benefits described above with respect to the other embodiments of the transducer assembly 125 are also attributable to transducer assembly 500.

In the embodiment shown in FIG. 5, unlike the relative orientation of the components as described in FIG. 2, the transducer assembly 500 is straight such that the angle α described above is 180 degrees (i.e., such that the first central axis A1 and the second central axis A2 are colinear). In such embodiments, the attachment portion 135 of the transducer assembly 500 does not have an elbow 185 and the opening 175 at the second end 155 of the attachment portion 135 extends in a plane that is perpendicular to the first central axis A1. However, as with certain exemplary embodiments above, attachment portion 135 and transducer portion 140 are formed of different materials having different acoustic impedances.

In one or more embodiments, when the transducer assembly 500 is attached to the marine device 130, the transducer assembly 500 may extend longitudinally from the marine device 130 along the same primary axis as the marine device 130. In one or more other embodiments, the transducer assembly 500 may be used in conjunction with a marine device 130 that has receiving end 230 opening downward such that the transducer assembly 500 extends perpendicularly from the marine device 130. In still other embodiments, the receiving end 230 of the marine device 130 may open at an angle such that when the transducer assembly 500 is attached to the marine device 130, the transducer assembly 500 extends from the marine device 130 at the same angle at which the receiving end 230 of the marine device 130 opens. In such embodiments, the transducer assembly 500 may extend below the surface of the water at an angle relative to the plane of the surface of the water and relative to the horizontal extension of the main body 240 of the marine device 130.

This disclosure provides a transducer assembly that is attachable to a marine device. The transducer assembly has a horizontal attachment portion that attaches to an existing attachment point of the marine device. As discussed, the attachment portion is fabricated with a relative larger diameter and of a first material selected for strength, while the transducer portion of the transducer assembly is fabricated with a reduced diameter of a second material selected to minimize interference with signals to be detected by the transducer portion. The reduced diameter of the transducer portion reduces the incidence and magnitude of drag, strain, snag, impact, and noise during survey operations and minimizes their negative effects on the results of the operation. In addition, the overmold material of the transducer portion is selected to be a different material than the overmold material of the attachment portion. Specifically, the overmold material of the transducer portion is selected to have a specific acoustic impedance that does not interfere with the operation of the transducer positioned within the transducer portion. Such materials are typically costly. In contrast, a less costly material may be selected to form the body of the attachment portion. By only using the more costly material only to form the overmold of the transducer portion with less expensive material utilized to form the body of the attachment portion, the transducer assembly can be produced in a more cost-effective manner.

An underwater transducer assembly for attachment to marine equipment has been described.

Optionally, the underwater transducer assembly may include an attachment portion extending along a first axis and having a first diameter; and a transducer portion extending along a second axis and having a second diameter that is less than the first diameter; wherein the transducer portion is detachably coupled to the attachment portion; and wherein the first axis and second axis intersect to form an angle that is greater than 0 degrees and equal to or less than 180 degrees.

Optionally, the underwater transducer assembly may include an attachment portion extending along a first axis, the attachment portion having a first body with a first end and a second end, at least a portion of the first body having a first diameter, the first body formed of a first material having a first acoustic impedance; a transducer portion extending along a second axis, the transducer portion having a second body with a first end and a second end, the second body having a second diameter that is smaller than the first diameter, the second body formed of a second material having a second acoustic impedance that is less than the first acoustic impedance; and a transducer element disposed within the second body; wherein the first axis and second axis intersect to form an angle that is equal to or greater than 60 degrees and equal to or less than 180 degrees.

Optionally, the underwater transducer assembly may include an attachment portion extending along a first axis, the attachment portion having a first body with a first end and a second end, at least a portion of the first body having a first diameter, the first body formed of a first material having a first acoustic impedance; a transducer portion extending along a second axis, the transducer portion having a second body with a first end and a second end, the second body having a second diameter that is smaller than the first diameter, the second body formed of a second material having a second acoustic impedance that is less than the first acoustic impedance; and a transducer disposed within the second body; wherein the first axis and second axis are colinear.

Optionally, the underwater transducer assembly may include a first end and a second end and extending along an axis; a base disposed at the first end of the assembly and formed of a first material having a first acoustic impedance; a support extending from the base, the support having a first end attached to the base and a second end spaced apart from the base; a transducer element attached to the second end of the support so that the transducer element is positioned along the axis; and an overmold housing disposed about the transducer element, the overmold housing having a first end adjacent the base and a second end spaced apart from the base.

Optionally, the underwater transducer assembly may be part of an underwater acoustic ranging assembly including the a semi-buoyant marine component and the underwater transducer assembly, wherein the underwater transducer assembly may further include an attachment portion coupled to the semi-buoyant marine component, the attachment portion extending along a first axis and having a first body with a first end and a second end, at least a portion of the first body having a first diameter; and a transducer portion extending along a second axis and having a second body with a first end and a second end, at least a portion of the second body having a second diameter that is less than the first diameter; wherein the first axis and second axis intersect to form an angle that is greater than 0 degrees and equal to or less than 180 degrees.

Any of the foregoing underwater transducer assemblies may further include, alone or in combination, any of the following:

The first body is cylindrical.
The second body is cylindrical.
The first end of the first body includes an attachment mechanism.
The attachment mechanism comprises a sleeve mounted on the first end of the first body.
The sleeve comprises at least one annular groove disposed about a perimeter of the sleeve and at least one radially extending fastener aperture.
The sleeve comprises a hard plastic.
The sleeve has an outer diameter that is the same as the first diameter.
The first end of the first body has a third diameter that is less than the first diameter.
The angle is approximately 90 degrees.
The angle is between 80 degrees and 120 degrees.
The second acoustic impedance is approximately 1.48 $MPa \cdot s \cdot m^{-1}$.
The second acoustic impedance is less than 1.60 $MPa \cdot s \cdot m^{-1}$ and the first acoustic impedance is greater than 1.60 $MPa \cdot s \cdot m^{-1}$.
The second acoustic impedance is in a range from 1.30 $MPa \cdot s \cdot m^{-1}$ to 1.60 $MPa \cdot s \cdot m^{-1}$ and the first acoustic impedance is outside the range.
The second acoustic impedance is approximately equivalent to seawater.
The second end of the first body includes an elbow.
The elbow defines the angle of intersection of the first and second axis.
The elbow is a 90-degree elbow.
The second end of the first body includes an opening.
The opening at the second end of the first body is coaxial with the second axis.
The transducer portion seats in the opening in the second end of the first body of the attachment portion.
The attachment portion and the transducer portion are integrally formed.
The transducer portion is detachably coupled to the attachment portion.
The first end of the second body includes an opening.
The first end of the second body includes an attachment mechanism, the attachment mechanism comprising an insert disposed in the opening in the first end of the second body.
The insert includes a protrusion disposed to seat in the opening in the first end of the second body.
The marine equipment is a semi-buoyant towable marine component.
The marine equipment is an underwater vehicle.
The second end of the overmold housing is hemispherical in shape.
The transducer element is positioned at the center of the hemispherical second end.
The support is conical in shape, with a first end having a diameter that is substantially the same as a diameter of the base.
At least a portion of the length of the overmold housing has a reducing thickness from the second end to the first end.
The first end of the first body includes an attachment mechanism for attaching the transducer assembly to the semi-buoyant marine component.
The marine component is towable.
The marine component is an underwater vehicle.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. An underwater transducer assembly for attachment to marine equipment, the transducer assembly comprising:
   an attachment portion extending along a first axis and having a first diameter; and
   a transducer portion extending along a second axis and having a second diameter that is less than the first diameter;
   wherein the transducer portion is detachably coupled to the attachment portion; and
   wherein the first axis and second axis intersect to form an angle that is greater than 0 degrees and equal to or less than 180 degrees.

2. The underwater transducer assembly of claim 1,
   wherein the attachment portion is formed of a first material having a first acoustic impedance; and
   wherein the transducer portion is formed of a second material having a second acoustic impedance that is less than the first acoustic impedance.

3. The underwater transducer assembly of claim 2, wherein the second acoustic impedance is less than 1.60 MPa·s·m$^{-1}$ and the first acoustic impedance is greater than 1.60 MPa·s·m$^{-1}$.

4. The underwater transducer assembly of claim 2, wherein the second acoustic impedance is approximately equivalent to seawater.

5. The underwater transducer assembly of claim 1, wherein the angle is approximately 90 degrees.

6. The underwater transducer assembly of claim 1, wherein the attachment portion includes an elbow.

7. The underwater transducer assembly of claim 6,
   wherein the elbow defines the angle of intersection of the first and second axis; and
   wherein the elbow is a 90-degree elbow.

8. An underwater transducer assembly for attachment to marine equipment, the transducer assembly comprising:
   an attachment portion extending along a first axis, the attachment portion having a first body with a first end and a second end, at least a portion of the first body having a first diameter, the first body formed of a first material having a first acoustic impedance;
   a transducer portion extending along a second axis, the transducer portion having a second body with a first end and a second end, the second body having a second diameter that is smaller than the first diameter, the second body formed of a second material having a second acoustic impedance that is less than the first acoustic impedance; and
   a transducer element disposed within the second body;
   wherein the transducer portion is detachably coupled to the attachment portion; and
   wherein the first axis and second axis intersect to form an angle that is equal to or greater than 60 degrees and equal to or less than 180 degrees.

9. The underwater transducer assembly of claim 8, wherein the first end of the first body includes an attachment mechanism.

10. The underwater transducer assembly of claim 9, wherein the attachment mechanism comprises a sleeve mounted on the first end of the first body.

11. The underwater transducer assembly of claim 8, wherein the angle is approximately 90 degrees.

12. The underwater transducer assembly of claim 8, wherein the second acoustic impedance is less than 1.60 MPa·s·m$^{-1}$ and the first acoustic impedance is greater than 1.60 MPa·s·m$^{-1}$.

13. The underwater transducer assembly of claim 8, wherein the second acoustic impedance is approximately equivalent to seawater.

14. The underwater transducer assembly of claim 8, wherein the second end of the first body includes an elbow.

15. The underwater transducer assembly of claim 14,
   wherein the elbow defines the angle of intersection of the first and second axis; and
   wherein the elbow is a 90-degree elbow.

16. The underwater transducer assembly of claim 8,
   wherein the second end of the first body includes an opening coaxial with the second axis; and
   wherein the transducer portion seats in the opening in the second end of the first body of the attachment portion.

17. An underwater acoustic ranging assembly comprising:
   a semi-buoyant marine component; and
   and transducer assembly attached to the marine component, the transducer assembly comprising:
      an attachment portion coupled to the semi-buoyant marine component, the attachment portion extending along a first axis and having a first body with a first end and a second end, at least a portion of the first body having a first diameter; and
      a transducer portion extending along a second axis and having a second body with a first end and a second end, at least a portion of the second body having a second diameter that is less than the first diameter;
      wherein the first axis and second axis intersect to form an angle that is greater than 0 degrees and equal to or less than 180 degrees.

18. The underwater acoustic ranging assembly of claim 17,
   wherein the first body of the attachment portion of the transducer assembly is formed of a first material having a first acoustic impedance; and
   wherein the second body of the transducer portion of the transducer assembly is formed of a second material having a second acoustic impedance that is less than the first acoustic impedance.

19. The underwater acoustic ranging assembly of claim 18, wherein the second acoustic impedance is less than 1.60 MPa·s·m$^{-1}$ and the first acoustic impedance is greater than 1.60 MPa·s·m$^{-1}$.

20. The underwater acoustic ranging assembly of claim 18, wherein the second acoustic impedance is approximately equivalent to seawater.

21. The underwater acoustic ranging assembly of claim 17, wherein the first end of the first body includes an attachment mechanism for attaching the transducer assembly to the semi-buoyant marine component.

22. The underwater acoustic ranging assembly of claim 17, wherein the angle is approximately 90 degrees.

23. The underwater acoustic ranging assembly of claim 17,
wherein the second end of the first body includes an elbow that defines the angle of intersection of the first and second axis; and
wherein the elbow is a 90-degree elbow.

24. An underwater transducer assembly for attachment to marine equipment, the transducer assembly comprising:
an attachment portion extending along a first axis, the attachment portion having a first body with a first end and a second end, at least a portion of the first body having a first diameter, the first body formed of a first material having a first acoustic impedance;
a transducer portion extending along a second axis, the transducer portion having a second body with a first end and a second end, the second body having a second diameter that is smaller than the first diameter, the second body formed of a second material having a second acoustic impedance that is less than the first acoustic impedance; and
a transducer disposed within the second body;
wherein the first axis and second axis are colinear.

25. The underwater transducer assembly of claim 24, wherein the second acoustic impedance is less than 1.60 MPa·s·m$^{-1}$ and the first acoustic impedance is greater than 1.60 MPa·s·m$^{-1}$.

26. The underwater transducer assembly of claim 24, wherein the second acoustic impedance is approximately equivalent to seawater.

27. The underwater acoustic ranging assembly of claim 26, wherein the transducer portion is detachably coupled to the attachment portion.

28. The underwater transducer assembly of claim 24,
wherein the second end of the first body includes an opening; and
wherein the transducer portion seats in the opening in the second end of the first body of the attachment portion.

* * * * *